US012633717B2

(12) United States Patent
Delavaux et al.

(10) Patent No.: US 12,633,717 B2
(45) Date of Patent: May 19, 2026

(54) OPTICAL BEACON SOURCE UTILIZING PULSED FIBER AMPLIFIERS

(71) Applicant: Cybel, LLC., Bethlehem, PA (US)

(72) Inventors: Jean-Marc Pierre Delavaux, Pittstown, NJ (US); Wiktor Tomasz Walasik, Bethlehem, PA (US); Glen Munroe Williams, Alexandria, VA (US)

(73) Assignee: Cybel, LLC., Bethlehem, PA (US)

( * ) Notice: Subject to any disclaimer, the term of this patent is extended or adjusted under 35 U.S.C. 154(b) by 1038 days.

(21) Appl. No.: 17/746,480

(22) Filed: May 17, 2022

(65) Prior Publication Data

US 2023/0378711 A1      Nov. 23, 2023

(51) Int. Cl.
*H01S 3/094* (2006.01)
*G02F 1/11* (2006.01)
*H01S 3/067* (2006.01)

(52) U.S. Cl.
CPC .......... *H01S 3/094076* (2013.01); *G02F 1/11* (2013.01); *H01S 3/06754* (2013.01); *H01S 3/06758* (2013.01); *H01S 3/094003* (2013.01)

(58) Field of Classification Search
None
See application file for complete search history.

(56) References Cited

U.S. PATENT DOCUMENTS

| | | | |
|---|---|---|---|
| 5,867,305 A | 2/1999 | Waarts et al. | |
| 5,999,296 A | 12/1999 | Nishiura | |

| | | | |
|---|---|---|---|
| 7,739,034 B2 | 6/2010 | Farwell | |
| 7,872,794 B1 * | 1/2011 | Minelly | H01S 3/1001 359/337.13 |
| 8,315,525 B2 | 11/2012 | Cunningham | |
| 9,246,303 B1 * | 1/2016 | Rockwell | G01S 7/484 |
| 9,813,151 B2 | 11/2017 | Kingsbury et al. | |
| 9,826,292 B2 | 11/2017 | Coleman et al. | |
| 10,012,477 B1 | 7/2018 | Ell et al. | |
| 10,250,336 B1 | 4/2019 | Palmer | |
| 10,530,478 B2 | 1/2020 | Kingsbury et al. | |
| 10,917,173 B2 | 2/2021 | Kingsbury et al. | |
| 11,194,024 B2 | 12/2021 | Schmitt et al. | |
| 2008/0094605 A1 * | 4/2008 | Drodofsky | H01S 3/06754 359/345 |
| 2013/0156439 A1 | 6/2013 | Arnold et al. | |
| 2015/0303646 A1 | 10/2015 | Levy et al. | |

(Continued)

OTHER PUBLICATIONS

Bose, Navonil, et al., "Nonlinear Pulse Reshaping in a Designed Erbium-Doped Fiber Amplifier with a Multicladded Index Profile", Optical Engineering 52(8), Aug. 2013/vol. 52(8), pp. 086104-1 to 086104-9.

(Continued)

*Primary Examiner* — Eric L Bolda

(74) *Attorney, Agent, or Firm* — Wendy W. Koba

(57) ABSTRACT

A pulsed optical beacon source is formed of a fiber-based amplifier including a preamplifer stage (responsive to a CW seed laser source) and a booster stage coupled to the output of the preamplifier stage. The pump input to at least one stage is pulsed and controlled in a manner that allows for the formation of a pulsed beacon output that is able to perform the PAT requirements of a beacon source, while also allowing for a low bit rate (e.g., a few Hz to a few kHz) upstream data signal to be sent between the beacon source and a target's optical receiver.

20 Claims, 10 Drawing Sheets

(56) References Cited

U.S. PATENT DOCUMENTS

2017/0294757 A1* 10/2017 Rapp ................... H01S 3/13013
2020/0150250 A1 5/2020 Boyraz et al.

OTHER PUBLICATIONS

Figura, Joe, et al., "Initial Demonstration of an Uplink LED Beacon to a Low Earth Orbiting CubeSat", Journal of Small Satellites, (2018), vol. 7, No. 2, pp. 719-732.
Feng, Zitong, et al., "Ultra-Low Noise Optical Injection Locking Amplier with AOM-Based Coherent Detection Scheme", Scientific Reports, Published online Sep. 3, 2018, pp. 1-7.

* cited by examiner

OPTICAL BEACON SOURCE UTILIZING PULSED FIBER AMPLIFIERS

TECHNICAL FIELD

The present invention relates to a pulsed optical beacon source suitable for use in free space optical communication systems as both a means to acquire and track an identified target (such as a communication satellite) as well as a signal path for relatively low bit-rate data transmission.

BACKGROUND OF THE INVENTION

Optical beacon lasers are used in many free space terrestrial and spatial communication applications, where the beacon output is typically a continuous wave (CW) light that is used to "point, acquire, track" (PAT) a given target. The beacons operate as a free-space signal path and may form part of a ground-to-air system or a completely air-borne system. The use of a CW light source as the beacon is limited in terms of the output power that may be generated, where the output power determines how far the beam may travel before becoming too attenuated to be received. Advantageously, the use of a pulsed beacon provides a higher-power output beam that can travel further than the CW light for the same power consumption.

Development is on-going to create pulsed beacon sources, particularly sources that are sufficiently robust in terms of output pulse characteristics, so that the beacon may also be used as a communication channel for data communications.

SUMMARY OF THE INVENTION

The needs remaining in the art are addressed by the present invention, which relates to an optical beacon suitable for use in satellite communication systems and, more particularly, to a high-power pulsed beacon source able to perform pointing/acquisition/tracking (PAT) requirements as well as provide a data communication link between a ground station and a satellite (or more generally, any "target" with which the ground station communicates over a free-space optical link).

In accordance with the principles of the present invention, an optical beacon comprises a multi-stage fiber laser that operates with a pulsed pump, providing an amplified laser output signal with a modulation rate that is controlled (and adjustable) by controlling the pulsed output of the pump.

An exemplary embodiment of the present invention comprises a two-stage fiber laser including a preamplifer stage (responsive to a CW seed laser source) and a booster stage coupled to the output of the preamplifier stage. Both amplifier stages include sections of rare-earth doped optical fiber, with a pump beam input used in each stage to generate the gain necessary to form a high-power output optical beacon. At least the pump input to one stage is pulsed and controlled in a manner that allows for the formation of a pulsed beacon that is able to perform the PAT requirements of a beacon source, while also allowing for a low bit rate (e.g., a few Hz up to perhaps 10's of kHz) upstream data signal to be sent between a ground terminal and a satellite's optical receiver.

In embodiments where a pulsed pump is used in both the preamplifier and booster stages, the timing of the pulses can be synchronized in a manner that generates high peak power in the beacon output pulse with an extinction ratio in excess of 60 dB.

In one arrangement, the invention takes the form of a pulsed optical beacon source comprising a seed laser source, an optical fiber-based preamplifier, and an optical fiber-based power boosting amplifier, where either one or both of the preamplifier and power boosting amplifier utilizes a pulsed pump input. The optical fiber-based preamplifier includes a first section of rare-earth doped gain fiber and receives as separate inputs the optical signal provided by the input seed laser and a first pump beam, the pump beam operating a wavelength suitable for amplifying the optical signal provided by the input seed laser in the presence of the pump beam, forming an amplified light signal at the output thereof. The optical fiber-based power booster amplifier includes a second section of rare-earth doped gain fiber and receives as separate inputs the amplified light signal from the preamplifier and a second pump beam operating, wherein at least one of the first and second pump beams comprises a pulsed pump beam such that the output from the optical fiber-based power booster amplifier comprises a high power pulsed beacon optical signal.

Other and further embodiments and aspects of the present invention will become apparent during the course of the following discussion and by reference to the accompanying drawings.

BRIEF DESCRIPTION OF THE DRAWINGS

Referring now to the drawings, where like numerals represent like parts in several views:

FIG. 4 shows a variation of the arrangement of FIG. 3, in this case using a continuous pump beam input to the power boosting stage instead of a pulsed pump;

FIG. 5 illustrates yet another embodiment of the present invention, in this case using a modulated input signal (i.e., seed pulses) at the input to the preamplifier stage;

DETAILED DESCRIPTION

Described below are various embodiments of a high power pulsed optical beacon, based upon the utilization of a multi-stage optical fiber amplifier configuration, utilizing a pulsed pump input to at least one of the stages. Selected parameters of the output beacon pulses (e.g., peak power, pulse width, repetition rate, shape) are controlled using arrangements found in different ones of the embodiments of the present invention. Through careful design of the fiber amplifier stages as discussed below, the inventive pulsed beacon source is able to maintain a high extinction ratio, as well as a high polarization extinction ratio, in the output beacon pulse train with little or no disturbance to the coherence (i.e., phase and polarization state) of the input signal used to generate the beacon output. Advantageously, the pulsed configuration of a beacon source provides a longer reach (in terms of transmission distance) than a conventional CW beacon for the same power consumption, forming a more energy-efficient beacon source. The pumps may be implemented in a co-propagating arrangement with the optical signal, or a counter-propagating arrangement, or a combination of both.

Figure 1:
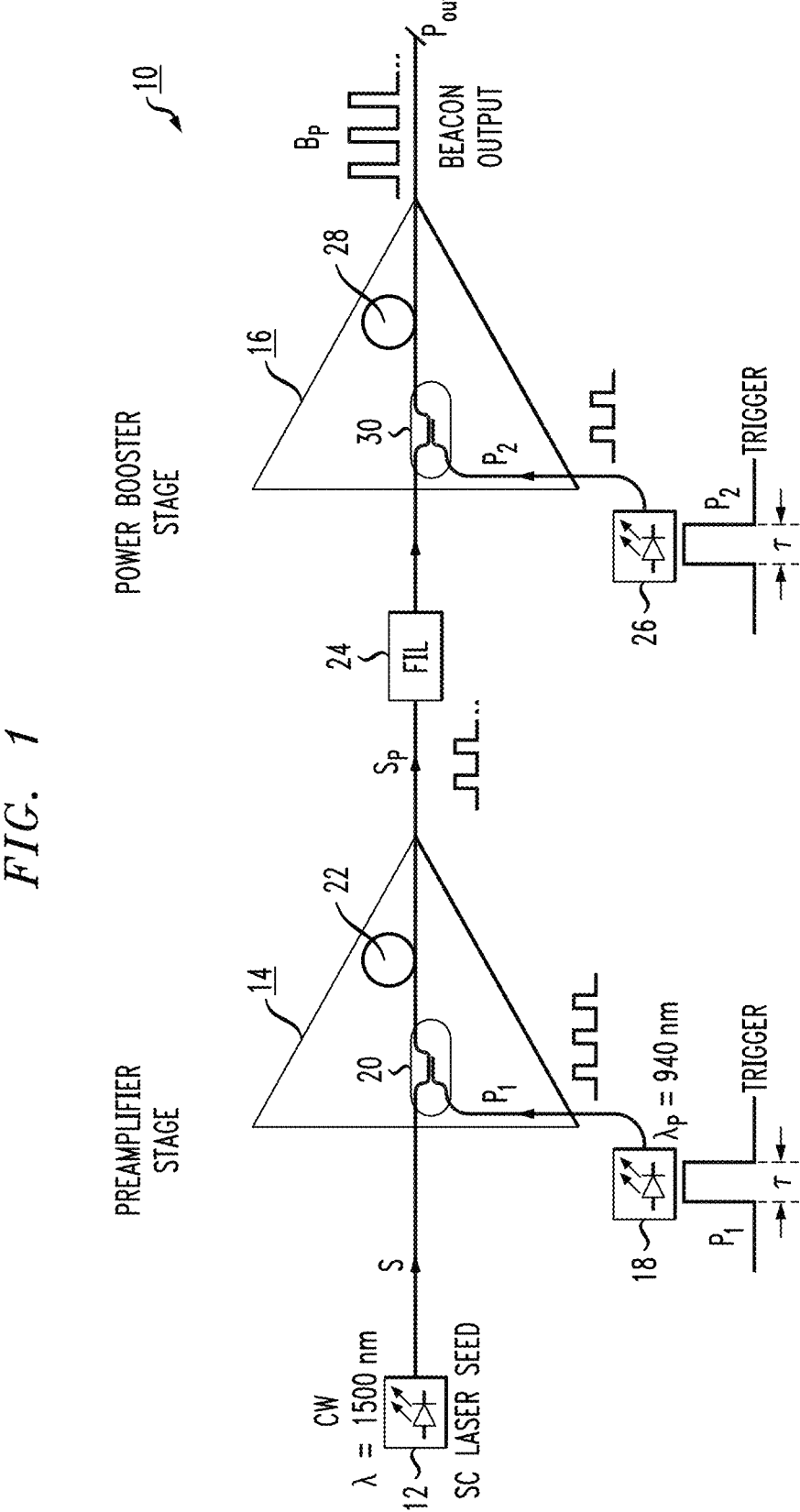
FIG. 1 illustrates an exemplary pulsed, high-power beacon source formed in accordance with the principles of the present invention, including a preamplifier stage and a power boosting stage, with pulsed pump sources used for each stage.

FIG. 1 illustrates an exemplary pulsed beacon source 10 formed in accordance with the principles of the present invention. Pulsed beacon source 10 functions to amplify an input signal from a standard laser source 12 using a pulsed preamplifier stage 14 followed by a pulsed power boosting stage 16 to generate high-power beacon output pulses. For the purposes of the present invention, "high power" is defined in terms of the peak power of the generated beacon pulses, which may be on the order of tens of watts, upwards to perhaps 100 W or more. The peak pulse power is a function of various inputs, including pump power and gain fiber characteristics, as well the duty cycle and repetition rate of the pulses.

While the beacon output is pulsed, it is typically "quasi-CW" in form, as required for many of the free-space optical tracking/illuminating applications. In this embodiment, laser source 12 is operated in CW mode to provide a continuous output signal S, and may comprise a conventional semiconductor laser, fiber laser, or the like. During the course of the following discussion laser source 12 may at times be referred to as a "seed laser", "seed source", or merely "seed", all descriptions familiar to those skilled in the art. It is to be understood that while the following discussion refers to a beacon source as comprising a single preamplifier stage and a single power boosting stage, either may be formed to include multiple, concatenated stages, depending on the expected performance of the beacon source, particularly in terms of output power.

A first pulsed pump source 18 is shown in FIG. 1 as associated with preamplifier stage 14, and is responsive to an applied electrical trigger signal to generate an output pump pulse train $P_1$. CW input signal light S and pump pulses $P_1$ are shown as provided as separate inputs to a pump/beam combiner 20 included within preamplifier stage 14. The combination of CW signal light S and pump pulses $P_1$ from combiner 20 is thereafter applied as an input to a selected length of gain fiber 22, generating as an output an amplified and pulsed version of the signal light input, denoted as $S_P$.

Seed laser 12 may operate at any desired wavelength (e.g., 1.0 μm, 1.5 μm, or 2.0 μm) and gain fiber 22 may include any appropriate rare-earth dopant, including but not limited to Yb, Er, a co-doping of Yb and Er, Tm, or Ho).

The use of pump pulses $P_1$ within gain fiber 22 (in contrast to a conventional CW pump beam) allows for the generation of signal output pulses $S_P$ with generally microsecond (μsec) rise and fall times, as well as a duty cycle (DC) that may be varied over a range from less than 1% to CW with a pulse repetition frequency (i.e., the number of pulses generated every second) that ranges from a few Hz to a few kHz, for example. The electrical trigger signal input to pulse source 18 defines the parameters of pump pulse $P_1$ in terms of pulse width and duty cycle in a manner that translates into the desired characteristics of signal output pulses $S_P$. Moreover, the use of a pulsed pump minimizes the generation of amplified spontaneous emission (ASE) within the gain fiber during the intervals between pump pulses. The minimization of ASE is important in generating output pulses with a high extinction ratio (ER). Additionally, concerns about ASE generation may be reduced by using an input seed power that drives preamplifier stage 14 in saturation. A high polarization extinction ratio (PER) is also provided, while conserving the coherence of the input seed light S from source 12 (coherence in terms of phase and polarization state) during amplification.

Continuing with the description of beacon source 10 of FIG. 1, the amplified, pulsed output $S_P$ from preamplifier stage 14 may be passed through a bandpass filter 24 before being applied as an input to power booster stage 16. Filter 24 is used to remove any spurious ASE that may be generated outside the transmission signal bandwidth. Amplified (and perhaps filtered) pulses $S_P$ are thereafter applied as a signal input to power booster amplifier stage 16. A second pulsed pump source 26 is used to provide pump pulses $P_2$ (again generated by a trigger input to source 26) to booster stage 16, and in particular pump pulses $P_2$ and amplified signal pulses $S_P$ are shown as applied as separate inputs to an optical combiner 30 of booster stage 16. Power booster stage 16 also includes a selected length of gain fiber 28, with the output from combiner 30 (i.e., the combination of $P_2$ and $S_P$) coupled into gain fiber 28. The amount of gain imparted by booster stage 16 is related to factors such as the length of gain fiber 28, its dopant concentration and absorption efficiency, and the power level of the applied pump. Working together, these factors are able to generate high-power output beacon pulses $B_P$ from the input combination of $S_P$ and $P_2$.

As discussed above, high-power pulsed beacon signal $B_P$ may be used to perform the functions of a conventional CW beacon (i.e., pointing, acquiring and tracking) as well as support the transmission of relatively low-rate data (in the range of a few Hz up to tens of kHz). By virtue of providing a pulsed output, the peak power delivered by the beacon source of the present invention (as defined by the peak power of an individual pulse) is greater than that obtained from a CW beacon source for the same power consumption. As will be discussed below, appropriate timing between the delivery of the preamplifier pump pulses $P_1$ and power booster pump pulses $P_2$ may be used to achieve desired characteristics of beacon output pulse $B_P$, particularly in terms of peak power, rise/fall times, ER, and PER.

For simplicity, pulsed beacon source 10 may be configured to utilize a single pump source (for example, only pump source 18), followed by a power splitter that is used to direct a first power level (perhaps 25%) of the pulsed pump output to preamplifier stage 14 and the remainder of the output power (e.g., 75%) to booster stage 16. In this case, the pump power may be distributed via a multimode coupler with a splitting ratio between the preamplifier (e.g., 25%) and booster stage (e.g., 75%).

An electrical triggering signal is typically used as a gating input to the pump laser source(s) to form the pulsed output. In most applications, beacon source 10 operates in a quasi-CW regime (particularly when performing the PAT functions), with the peak power of the beacon signal output pulses a function of the maximum power output of the pump laser devices. For the purposes of the present invention, the "quasi-CW regime" may be thought of as the condition where the pump pulse duty cycle is low enough to reduce thermal effects, but still long enough such that the output beacon is close to steady-state in form. The duty cycle (DC) and pulse width ($\tau$) of pump pulses $P_1$ can be changed to be periodic or random. As will be discussed in more detail below, the rate of build-up of inversion in gain fiber 22 limits the rise time of the amplified signal pulses $S_P$ and, as a result, the minimum pulse width and the maximum pulse repetition frequency (PRF) of output beacon pulses $B_P$. For reference purposes, the "pulse width" (here, $\tau$) is defined as the time duration of an individual pulse, the duty cycle (here, DC) is defined as the pulse width divided by the time interval associated with a single bit (i.e., a 50% duty cycle results in equal $\tau$ between "on" and "off"; a 10% duty cycle is associated with a pulse width $\tau$ that exists for only one-tenth of the time interval. Pulse repetition frequency (PRF) defines the number of pulses per second that are being transmitted.

Advantages of using pump pulsing instead of modulating the seed laser at the input to preamplifier stage 14 of pulsed beacon source 10 include at least the following: preservation of the coherence of seed laser output 5; creation of an amplified signal pulsed output $S_P$ that exhibits a higher signal extinction ratio (ER) and higher polarization extinction ratio (PER) than a modulated seed input; reduction in the power consumption of preamplifier pump source 18 (as opposed to an "always on" CW pump); and a reduced heat dissipation requirement. It is to be understood, however, that the peak power of pump pulse $P_1$ remains the same as the equivalent CW output power of a similar pump source. Extinction ratio (ER) is defined as a power ratio between the "on" state and "off" state of a propagating pulse train, and "polarization extinction ratio" is a measure of the degree to which the propagating optical signal remains confined to its principal polarization state during transmission.

Additionally, pump pulsing is preferred in various embodiments of the present invention so that no external optical modulator is required to generate the signal output pulses $S_P$, thus improving the amplifier's wall-plug efficiency (which in the prior art is related to the duty cycle associated with the pulsing of the input seed laser source, as opposed to the use of a CW seed laser in accordance with the present invention that is modulated within a fiber amplifier).

Continuing with the discussion of pump pulse characteristics, pump pulses $P_2$ from pump source 26 are preferably synchronized with pulses $P_1$ from preamplifier pump source 18 so as to optimize the delivery of pump pulses $P_2$ to gain fiber 28 with the desired pulse width and duty cycle. The timing between pump pulses $P_1$ and $P_2$ is preferably configured so that pump source 26 turns on before pump source 18 (i.e., pulse $P_2$ before pulse $P_1$) so that the booster stage gain fiber 28 is sufficiently inverted between the signal pulse $S_P$ arrives. The controlling of the pulse timing in this manner may lead to shortening of the rise time for beacon output pulses $B_P$, as gain peaking compensates for the slow rise time of input signal $S_P$.

Figure 2:
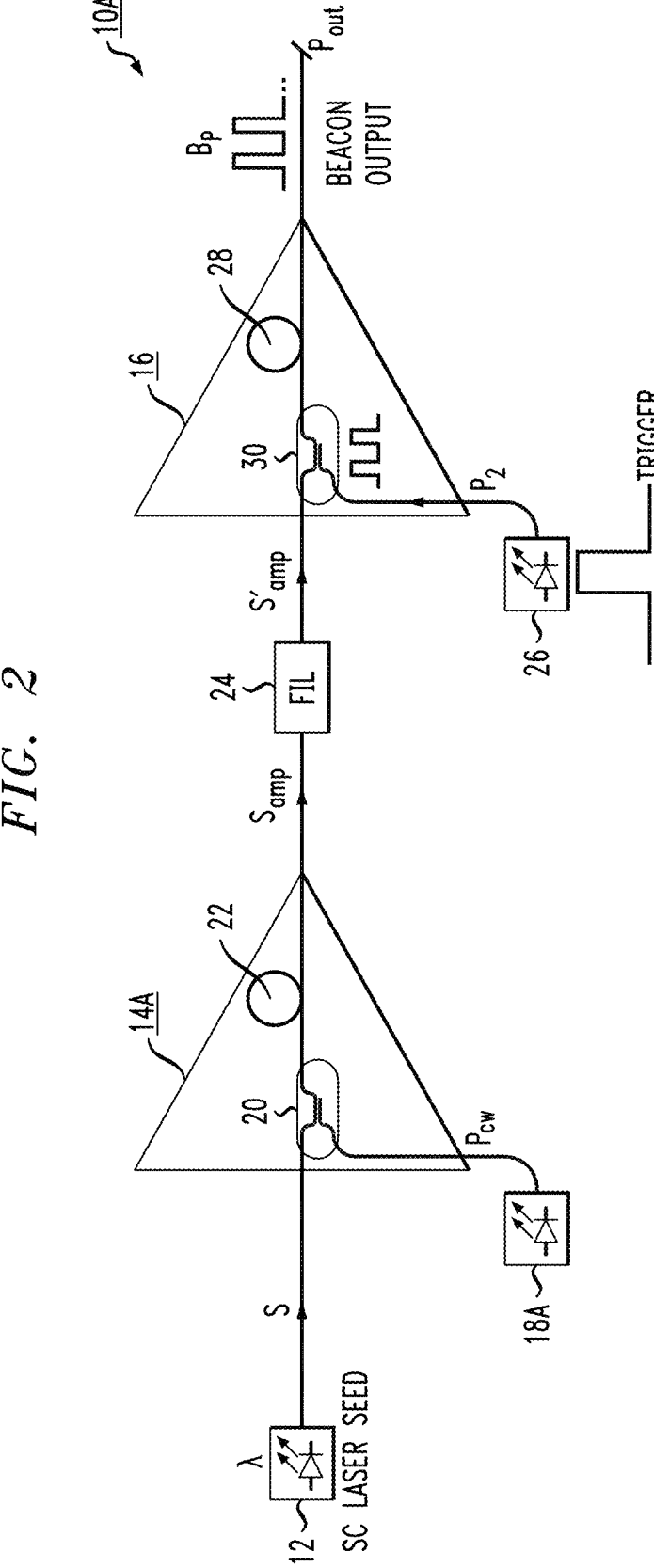
FIG. 2 shows an alternative embodiment of the pulsed beacon source of FIG. 1, in this case using a continuous pump beam input for the preamplifier stage.

An alternative beacon source configuration of the present invention may have the preamplifier stage operate with a CW pump source, limiting the use of pulses to the booster stage of the amplifier design. FIG. 2 illustrates an exemplary beacon source 10A which depicts this configuration. While most of the components of beacon source 10A are similar to those of beacon source 10 discussed above and function in the same manner, a preamplifier stage 14A is shown as comprising a conventional CW pump source 18A. In this case, preamplifier stage 14A provides a CW output $S_{amp}$ in the form of an amplified version of the CW input signal S from seed laser 12. This continuous light output $S_{amp}$ from preamplifier stage 14A may pass through bandpass filter 24 (to maintain the narrow linewidth of the signal input) prior to being applied as an input to power booster stage 16. Pump pulses $P_2$ interact with the CW input $S_{amp}$ within gain fiber 28 to create the desired high-power beacon output pulses $B_P$. In comparison to the fully-pulsed configuration discussed above, beacon output pulses $B_P$ of pulsed beacon source 10A may exhibit a somewhat lower extinction ratio, since the CW output $S_{amp}$ from preamplifier stage 14A might not be fully absorbed by gain fiber 28 of booster stage 16.

Figure 3:
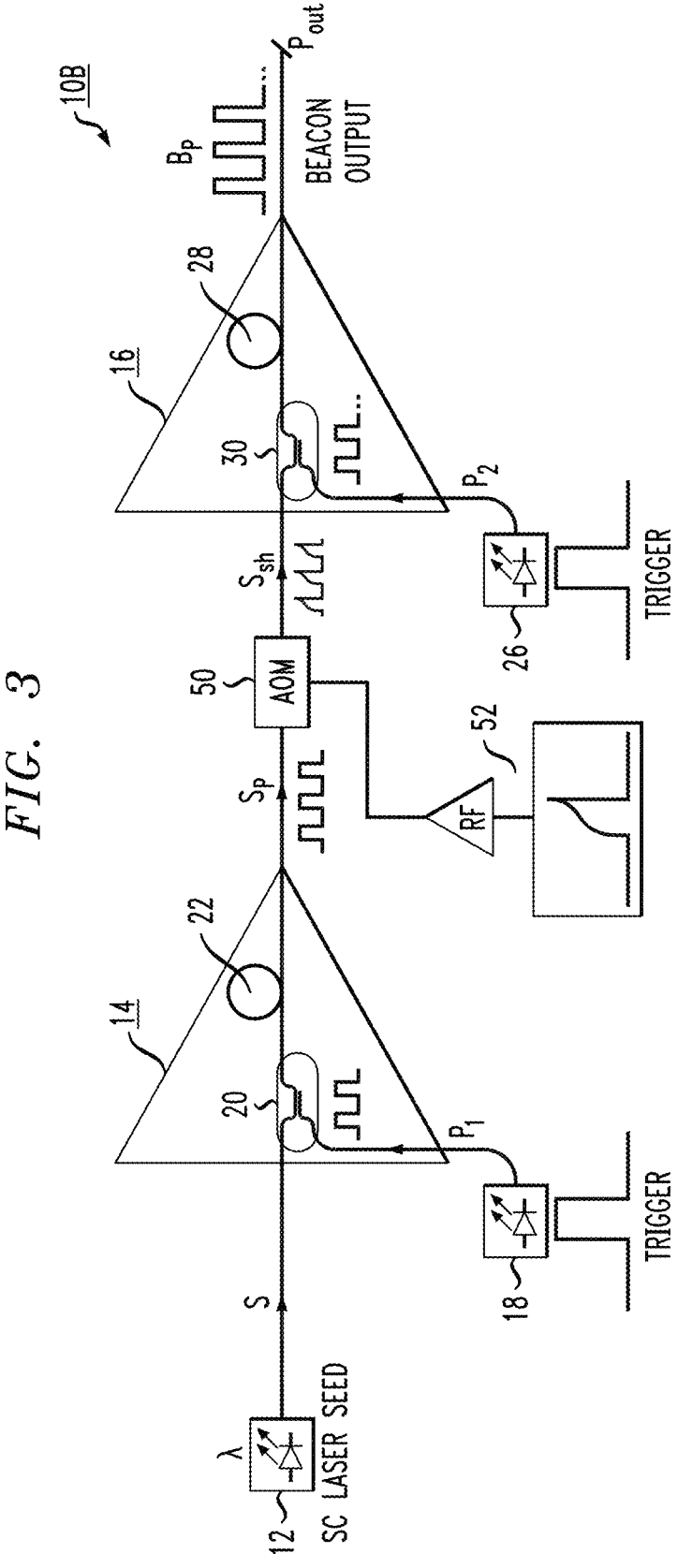
FIG. 3 illustrates another embodiment of the present invention, in this case including a pulse-shaping element between the output of the preamplifier stage and the input to the power boosting stage.

FIG. 3 illustrates yet another embodiment of a pulsed beacon source formed in accordance with the principles of the present invention, which in this case includes an inter-stage pulse shaping element that is used to further control the properties of the beacon output pulse train. A pulsed beacon source 10B is shown in FIG. 3 as comprising a similar preamplifier stage 14 and booster stage 16 as described above in association with beacon source 10 of FIG. 1. In this embodiment, however, a pulse-shaping element 50 (for example, an acousto-optic modulator (AOM)) is disposed along the signal path between the output of preamplifier stage 14 and the input to booster stage 16. AOM 50 functions to modify the shape (and possibly the width) of signal pulses $S_P$ in a manner that takes advantage of the properties of booster stage 16 to improve the properties of beacon output pulses $B_P$ (for example, in terms of ER, PRF, and/or attainable peak power).

In particular, since the rate of inversion that may be achieved by gain fiber 28 impacts the minimum achievable pulse width $\tau$ and maximum pulse repetition rate PFR of beacon output pulses $B_P$, pre-shaping of the input pulses $S_P$ in AOM 50 may be used to take the inversion rate of the gain fiber into consideration. For example, AOM 50 may be used to create shaped output pulses $S_{sh}$ with a sloped leading edge (to control (i.e., minimize) gain peaking in booster stage 16), and a shortened pulse width (to achieve higher repetition rates). As shown in FIG. 3, AOM 50 is driven with an arbitrary wave generator (AWG) 52 as an electrical input, enabling the generation of a defined pulse shape for signal pulses $S_{sh}$ which are thereafter applied as the signal input to booster stage 16. By adding this shaping to form input pulses $S_{sh}$, the beacon output pulses $B_P$ may exhibit sharper rise/fall times, as well as higher repetition rates, than the configurations of FIGS. 1 and 2. Other properties in pulse shape of the beacon output pulses $B_P$ may be provided by suitably adjusting the shape (and/or width) of input pulse $S_{sh}$ in other ways. While not explicitly illustrated in this drawing, bandwidth filter 24 may also be included in beacon source 10B, and used to block the ASE generated in preamplifier stage 14.

The amplifier topology of beacon source 10B may lead to the production of highly coherent beacon output pulses with high peak power, while minimizing power consumption and power dissipation, as well as minimizing impact of any fiber nonlinearities. Coherent pulse laser amplification with more than 100 W peak power and with a high PER (e.g., 20 dB) could be generated that way. In the embodiment of beacon source 10B as shown in FIG. 3, booster stage 16 is shown as being co-pumped; it is to be understood that a counter-pumped arrangement may also be used. Gain fibers 22 and 28 are preferably double-clad rare-earth doped fibers, but single-clad fibers may be used if compatible with the power level (i.e., a relatively low output power level). The type of fiber is preferably polarization maintaining fiber, but standard fibers may also be used. The pump sources 18 and 26 may comprise any suitable form, including but not limited to semiconductor pumps, solid state pumps, or fiber laser pumps.

Another benefit of using pulse shaping at the input to the booster stage of the inventive pulsed beacon source is the ability is to produce a well-defined amplified output pulse shape for beacon pulses $B_P$ (e.g., square top, Gaussian-shaped or any other suitable design) with a good extinction ratio (ER). In addition, pre-shaping of the input pulses (i.e., shaping pulses $S_P$ into pulses $S_{sh}$) helps to reduce the pump power required in booster stage 16 to achieve a desired peak power for beacon output pulses $B_P$.

Figure 4:
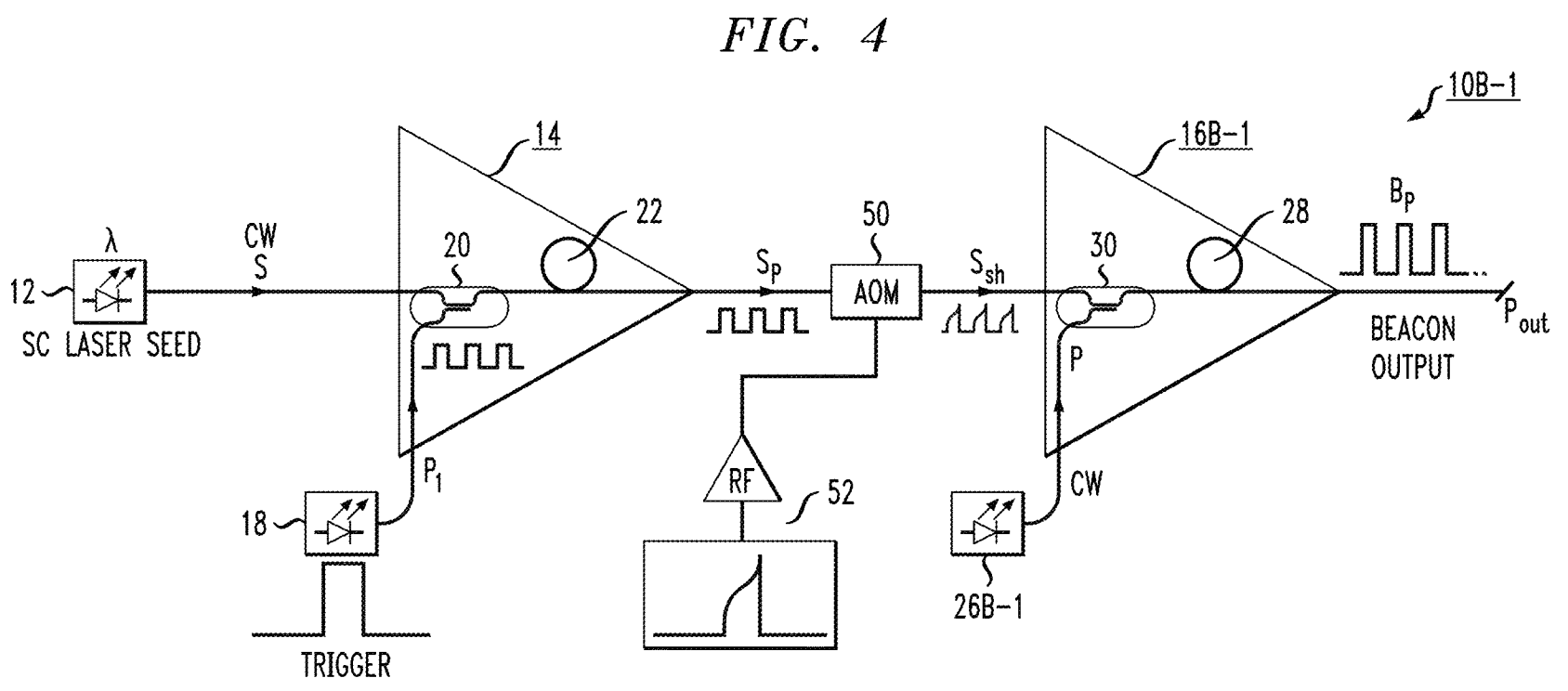

In particular, and further in accordance with the principles of the present invention, it has been found that the utilization of pulse shaping at the input to the power booster stage allows for the use of a CW pump input to the power booster amplifier stage, while still providing suitable beacon output pulses $B_P$. This embodiment is shown in FIG. 4, and is referred to as pulsed beacon source 10B-1. The use of a CW pump 26B-1 in a booster stage 16B-1 eliminates both the need for an external pump trigger source and a means for controlling pulse timing between $P_1$ and $P_2$.

In one example, if pump 26B-1 operates in CW mode and the corresponding CW power of booster stage 16 is 4 W, an input signal $S_{sh}$ with a duty cycle of 10% can therefore generate output pulses $B_P$ with a peak power as high as 40 W. Of course, this entails that gain fiber 28 can sustain the peak power for the duration of the pulse without the generation of stimulated Brillouin scattering (SBS). One approach is to choose a fiber with a large core or a fiber with a tapered core, where the core size increases from the input of the fiber to the output of the fiber.

Figure 5:
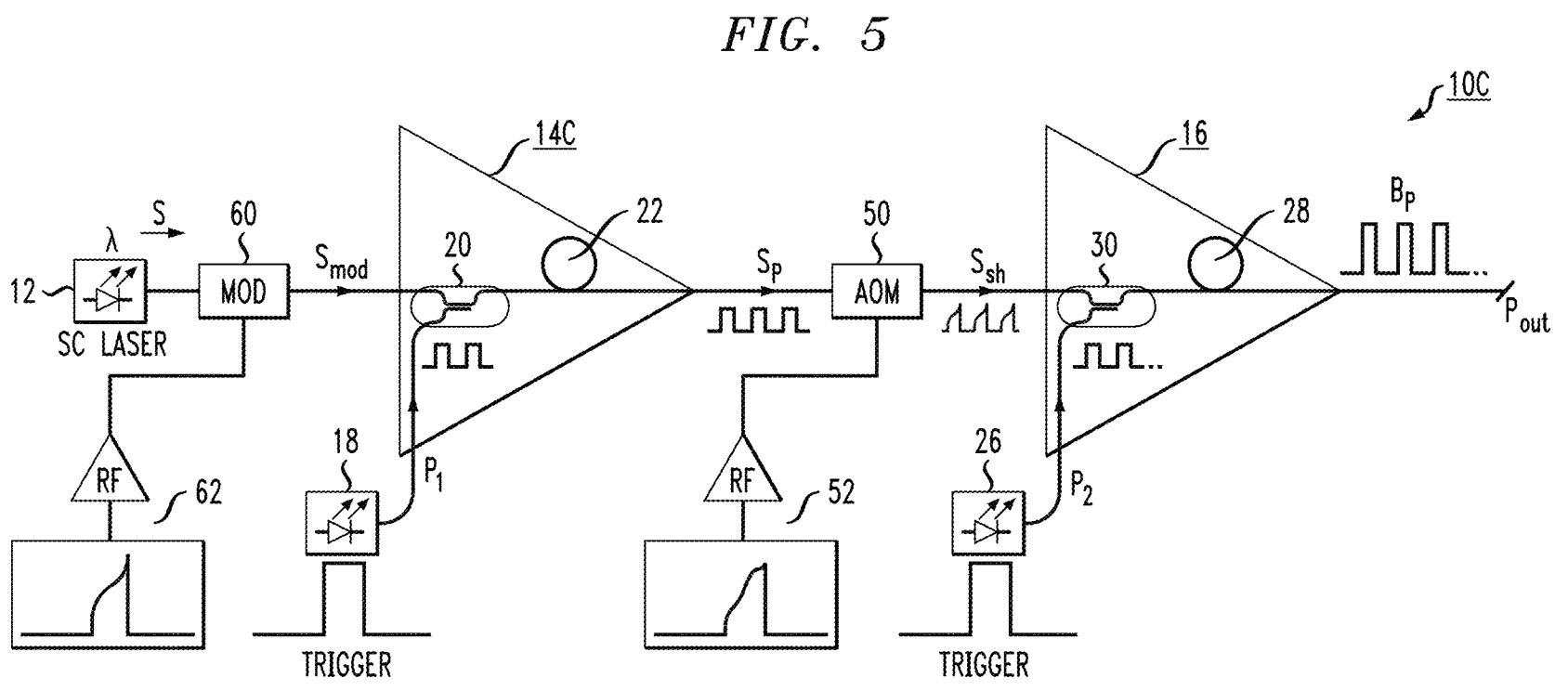

Another embodiment of the present invention is shown in FIG. 5, where in this case the seed laser source 12 is modulated prior to entering preamplifier stage 14. Denoted as beacon source 10C, a modulator 60 is shown as disposed along the signal path between seed laser 12 and the input to a preamplifier stage 14C. The CW output signal S from seed laser 12 passes through modulator 60, forming a pulsed (modulated) input signal $S_{mod}$ which is thereafter applied as an input to optical combiner 20 of preamplifier stage 14C. The inclusion of modulator 60 allows for the generation of beacon source output pulses $B_P$ with shorter minimum pulse width and higher maximum pulse frequency repetition than possible with the above-described embodiments. Modulator 60 is specifically configured by an arbitrary wave generator 62 to generate pulses with arbitrary shape, pulse width, and repetition frequency. Alternatively modulator 60 may be a portion of an optical transmitter (not shown) and used to provide a low bit-rate data signal that is imparted on the seed light, allowing for beacon pulses $B_P$ to perform the necessary PAT functions and also serve as a channel for low bit-rate data transmission.

In form, modulator 60 may comprise any one of a semiconductor optical amplifier (SOA), an AOM or an electro-optic modulator (EOM). The pump input to preamplifier stage 14C may be either a CW pump (such as source 18A of FIG. 2) or pulses (such as source 18 of FIG. 1), depending on the desired pulse width and duty cycle at the output of preamplifier stage 14C. The use of a pulsed pump in combination with a modulated input signal at the input of preamplifer stage 14C may be found to improve the ER in the generated signal pulses $S_P$. Also, as mentioned above, embodiments that use a pulsed pump instead of an "always on" CW have a lower power consumption.

Modulator 60 may be specifically configured to preserve the laser linewidth coherence during the pulse generation. In this case, the rise time and fall time of output pulse $S_P$ from preamplifier stage 14C is not limited by the fiber inversion rate of gain fiber 22 and the maximum modulation bandwidth of pulsed pump source 18. Indeed, the peak power of output pulse $S_P$ from preamplifier 14C is not limited by the CW power of preamplifier stage 14C, but instead is proportional to its CW power multiplied by the ratio of the pump pulse duration to the input signal pulse duration ($P_{peak}=P_{CW}\tau_{PUMP}/\tau_{SIG}$), as illustrated in plots of FIG. 6.

Figure 6:
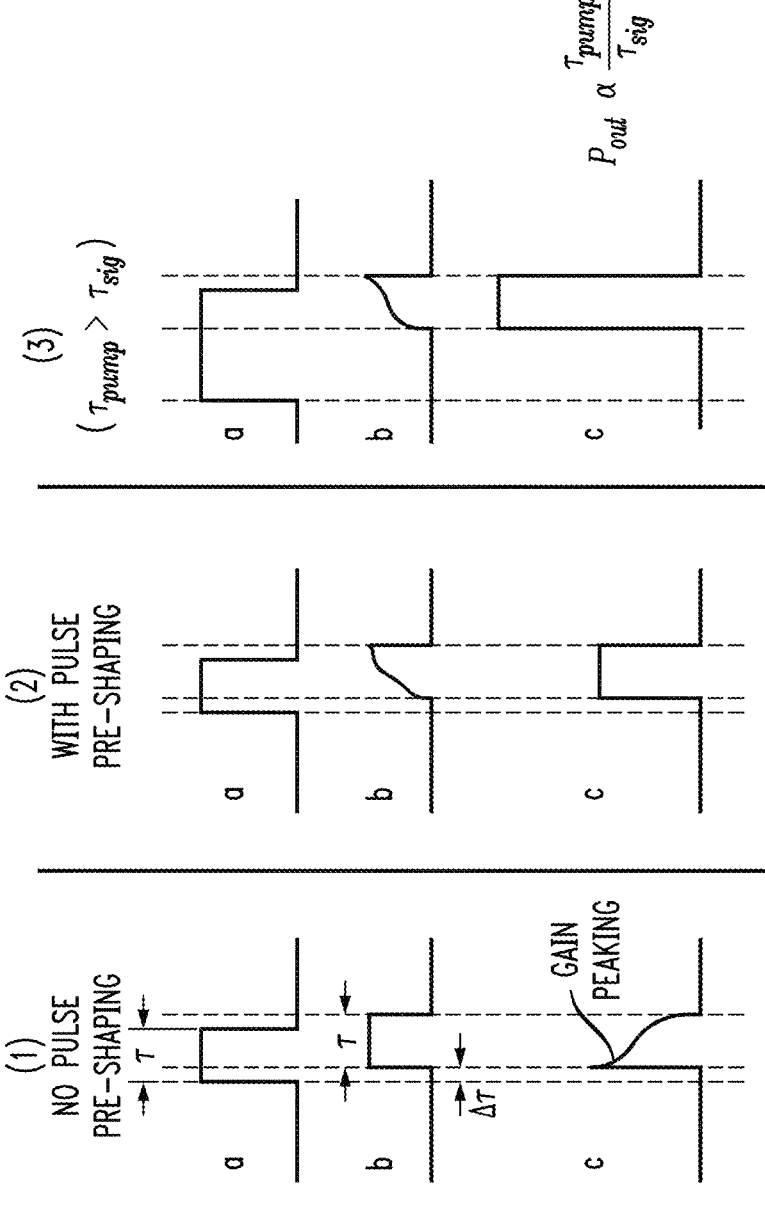
FIG. 6 contains a set of diagrams illustrating pulse-shaping properties associated with shaping input signal pulses, width changes of pump pulses, and controlling the timing between a pump pulse and a signal pulse.

In particular, FIG. 6 shows three different scenarios that are possible when operating a pulsed beacon source with a pulsed signal input in accordance with the embodiment of FIG. 5. For ease of understanding, only a single pump pulse is illustrated in FIG. 6. The top row of each column shows the timing and the shape of the pump pulses $P_1$ applied to preamplifier stage 14C, the middle row represents the input signal pulse $S_{mod}$ provided as an input to preamplifier stage 14C, and the bottom row shows the output pulse $S_P$ from preamplifier stage 14C.

In the scenario shown in column (a) of FIG. 6, the pump and input signal pulses have the same duration τ, and no pulse shaping is used for input signal pulse $S_{mod}$. As shown, signal pulse $S_{mod}$ is controlled in this case to lag pump pulse $P_1$ by a time interval Δτ, where the delay in timing between the two pulses allows for gain fiber 22 to be sufficiently inverted before signal pulse $S_{mod}$ arrives. The inversion state of gain fiber 22 at the arrival of the signal pulse thus prevents a slow rise time in the generated output signal pulse $S_P$, which would otherwise occur if the two pulses were applied simultaneously to gain fiber 22. Additionally, any spurious ASE generated beyond the falling edge of input signal pulse $S_{mod}$ is also controlled by this timing, since pump pulse $P_1$ terminates prior to signal pulse $S_{mod}$.

However, if time interval Δτ is too long, the inversion level in gain fiber 22 may be so high that gain peaking takes place when pulse $S_{mod}$ arrives, which is evidenced by the initial peak at the leading edge of output pulse $S_P$ as shown at the bottom of column (a) in FIG. 6. To prevent that from happening, signal pulse $S_{mod}$ might be appropriately pre-shaped, such as by using modulator 60 as discussed above. This scenario is illustrated in the second column (column (b)) of FIG. 6. The pre-shaping of signal pulse $S_{mod}$ can be optimized to provide an arbitrary pulse shape that compensates for gain peaking, here shown as re-shaping pulse $S_{mod}$ to include an upward ramp at its leading edge. The inclusion of pulse shaping allows for the output pulse $S_P$ from preamplifier stage 14 to exhibit minimal rise and fall times (as well as a relatively flat peak power level). The amount of pulse shaping is considered to be related to the extent of time interval Δτ, as well as the inversion properties of gain fiber 22.

Finally, the third column of FIG. 6 (column (c)) illustrates the situation where the input pulses $P_1$ and $S_{mod}$ do not have the same pulse width. In particular, the duration of pump pulse $P_1$ (shown as pulse width $\tau_{pump}$) is configured to be longer than the duration of signal pulse $S_{mod}$ (shown as pulse width $\tau_{sig}$). Increasing the pump duration $\tau_{pump}$ with respect to $\tau_{sig}$ as shown in column (c) leads to higher fiber inversion and therefore high output power, as more energy is stored in the fiber. In particular, the output peak power of generated pulses $S_P$ in this example will be ump proportional to the ratio between the pump and signal pulse duration, i.e., $P_{out} \propto \tau_{PUMP}/\tau_{SIG}$. Increasing the pump pulse duration might lead to gain peaking and even to ASE generation before the output pulse. However, for sufficiently high repetition rates, the pump might even be operated in continuous mode (such as shown in beacon source 10A of FIG. 2), without causing the issues mentioned above.

An advantage of the configuration of beacon source 10C as shown in FIG. 5 is that the inclusion of a separate modulator 60 with seed laser input 12 allows for the generation of arbitrarily-shaped output pulses $S_P$ (e.g., square top with and fast rise/fall times), which provide pulses with maximum peak power at the input to booster stage 16. In turn, the ability to provide a maximum input power to booster stage 16 helps to drive the saturation of booster amplifier 16 and eliminate the residual ASE generation within beacon output pulses $B_P$.

Beacon source 10C of FIG. 5 is shown as also including AOM 50 as an interstage element to perform additional pulse shaping prior to the input to booster stage 16. is shown as included in this embodiment and may be used to further adjust the shape of the signal pulse applied as an input to booster stage 16, further improving the properties of beacon output pulses $B_P$. Various AOM designs can accept as much as 5 to 10 W of average input power, which may translate to even higher accepted input peak power as exemplified by pulses $S_P$ as created using a modulated input signal. This means that preamplifier stage 14, which is represented figuratively by a single stage design, could instead comprise a multi-stage preamplifier configuration in accordance with the principles of the present invention and be capable of providing peak power levels closer to the maximum allowable AOM input peak power of 5 to 10 W average power.

An alternative use of interstage AOM 50 in this embodiment is to function as a gating switch. The role of AOM 50 in this case is to improve the ER of beacon output pulses $B_P$ by eliminating ASE generation between pulses. As a gating switch, AOM 50 may be used to carve a narrow pulse out of applied input pulse $S_P$ to create an extremely narrow input pulse $S_{sh}$ to booster stage 16. In this case, the gating of AOM 50 needs to be synchronized modulator 60 in order to optimize the ER and PER of the pulsed beacon source output $B_P$. The width of the pulse carved by mid-stage AOM 50 may be identical or smaller that of the input signal, depending on the chosen configuration. In some applications, the AOM may even be replaced by an EOM.

Figure 7:
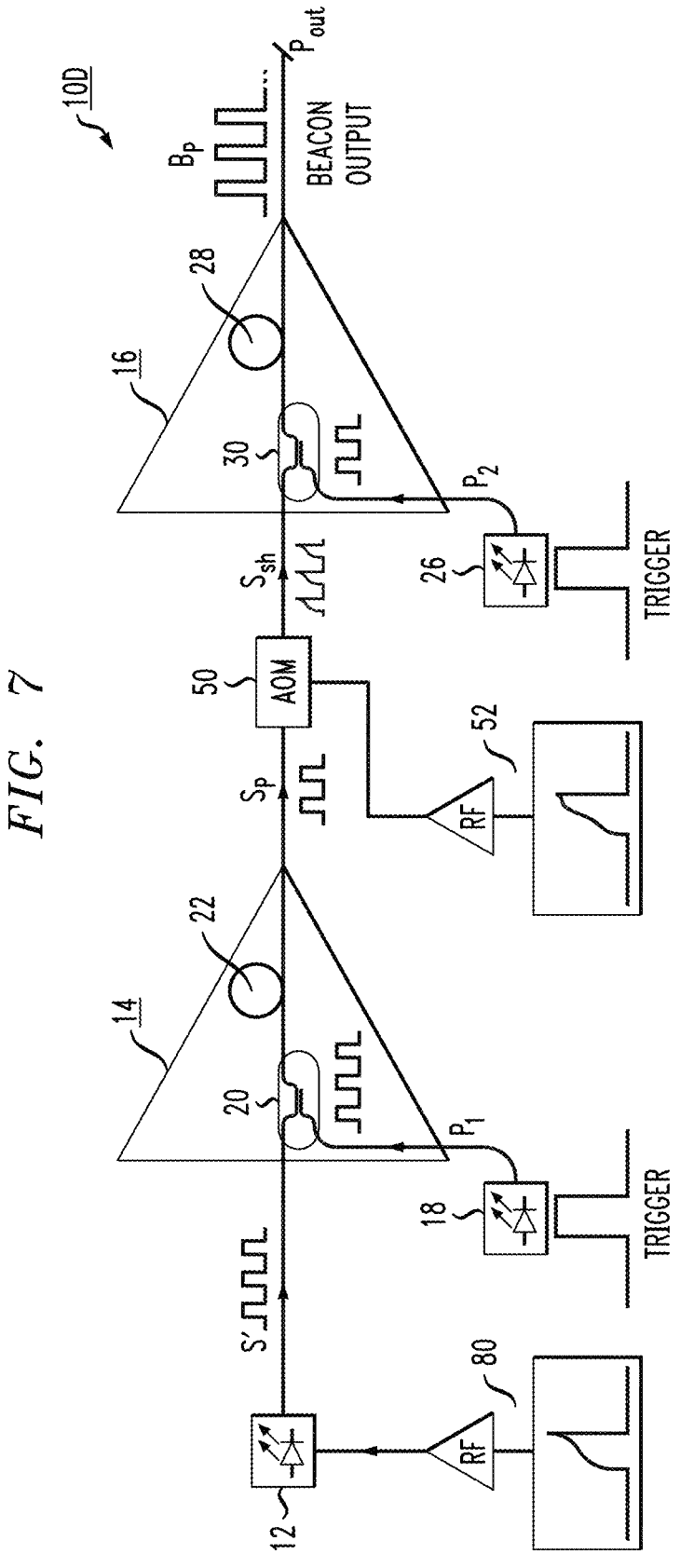
FIG. 7 illustrates a variation of the embodiment of FIG. 5, in this case using an arrangement to directly modulate the output of the seed laser source.

FIG. 7 illustrates another embodiment of a pulsed beacon source formed in accordance with the principles of the present invention, here identified as pulsed beacon source 10D. While similar in principle of beacon source 10C of FIG. 5, seed laser 12 is shown in this embodiment as being directly driven by an electrical modulation signal from a modulation source 80. The direct modulation of seed laser 12 allows the production of pulses S' with a large range of pulse widths and pulse repetition frequency, as controlled by the settings of modulation source 80. However, direct modulation is known to broaden the effective linewidth of seed laser 12, as a result of frequency chirp of the laser wavelength during pulsing. While potentially problematic in some cases, the use of direct modulation may be preferred in cases where its linewidth broadening may be used to increase the SBS threshold power, enabling an increase in the maximum output power extracted from the laser.

Figure 8:
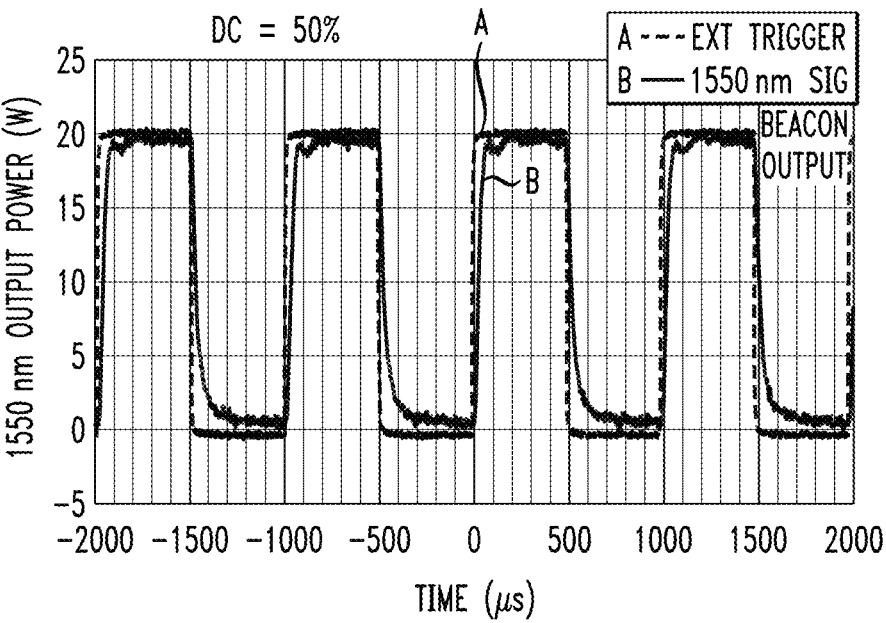
FIG. 8 contains a plot of a beacon output pulse, shown in relation to an electrical trigger signal used to control the timing of a pulsed pump applied to the booster stage of the beacon source.
Figure 9:
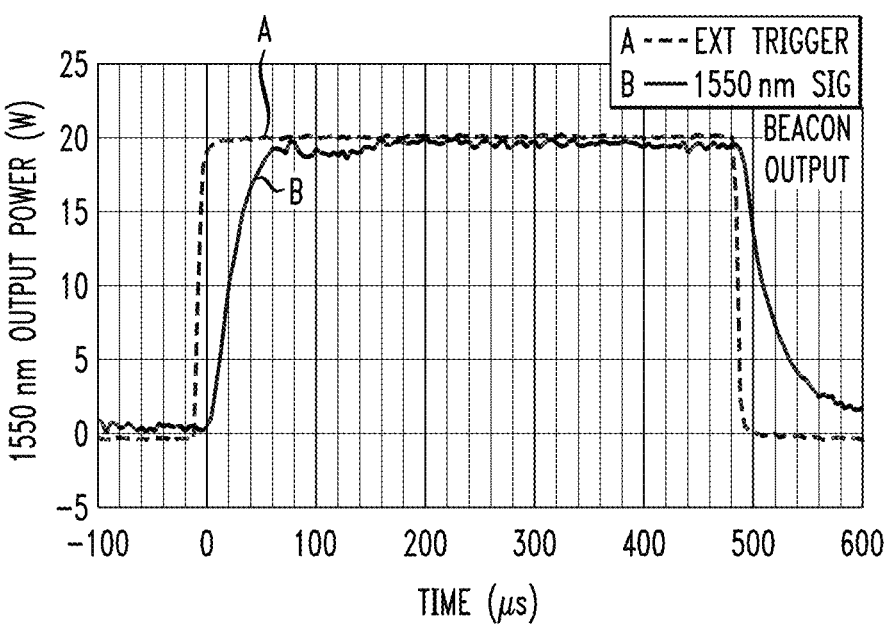
FIG. 9 is an expanded scaler version of the plot of FIG. 8, illustrating in particular the rise and fall times associated with a beacon output pulse.

FIGS. 8-12 contain plots of experimental data associated with various configurations of the inventive pulsed beacon source as discussed above. In particular, FIG. 8 is a plot of a beacon output pulse signal $B_P$ from an exemplary beacon source in the form of beacon source 10A, that utilizes a pulsed pump with its booster stage and a CW pump with its preamplifier stage. Curve A illustrates the electrical "trigger" pulse input applied to pump source 26, with curve B illustrating the pulsed beacon output signal $B_P$ (here operating at a wavelength of 1550 nm). This data is associated with the case where gain fiber 28 comprises a co-doped Er/Yb fiber and pump source 26 operates at a wavelength of 940 nm. The applied trigger is configured so that pump pulses $P_2$ exhibit a repetition rate of 1 kHz. As evident from curve A, a trigger having a 50% duty cycle was used to collect this data (resulting a pump pulse width $\tau_{pump}$ of about 500 µsec). FIG. 9 is an expanded scale version of FIG. 8, illustrating in particular the rise and fall times associated with a single beacon output pulse $B_P$. Referring to both FIGS. 8 and 9, it can be observed that beacon output pulse $B_P$ takes some time to both build up and decay, here on the order of tens of microseconds. As mentioned above, the use of a CW pump in preamplifier stage 14A may contribute to the generation of ASE within the output pulses $S_P$ of preamplifier stage 14A.

Figure 10:
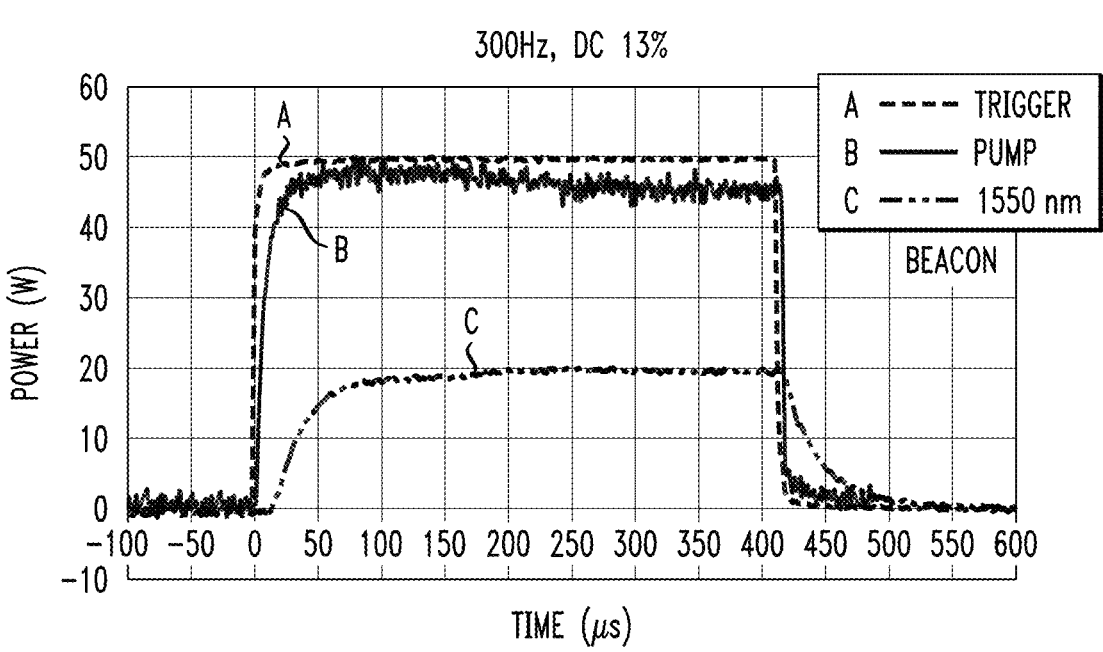
FIG. 10 contains a plot of a beacon output pulse, similar to that of FIG. 8, but in this case associated with a pulsed pump exhibiting a higher repetition rate and duty cycle.

FIG. 10 is a plot that illustrates an exemplary trigger pulse, pump pulse $P_2$, and beacon output pulse $B_P$ associated with conditions similar to those described above for FIGS. 8 and 9 (that is, a CW seed laser input and a CW pump input to preamplifer stage 14A of pulsed beacon source 14A). The data shown here are associated with a configuration where the repetition rate for pump pulses $P_2$ was 300 Hz, the pulse train having a duty cycle of about 13% (and a pump pulse width $\tau_{pump}$ on the order of about 420 µsec). Here, pump pulse $P_2$ (shown as curve B) exhibited a peak power of about 50 W. Curve C illustrates an associated beacon output signal pulse $B_P$ (in this case, a 1550 nm signal output), which in this case reaches an output power on the order of 20 W (based upon a 50 W pump input power). Comparing curves B and C, it is observed that pulsed beacon output pulse $B_P$ takes some time to build (tens of µsec) to this peak power level, as well as decay subsequent to the fall time of pump pulse $P_2$. If faster rise and fall times are required, seed source 12 and preamplifier stage 14 may be pulsed in some synchronization with the booster pump, such as shown in the embodiment of pulsed beacon source 10C (FIG. 7) or pulsed beacon source 10D (FIG. 9).

Figure 11:
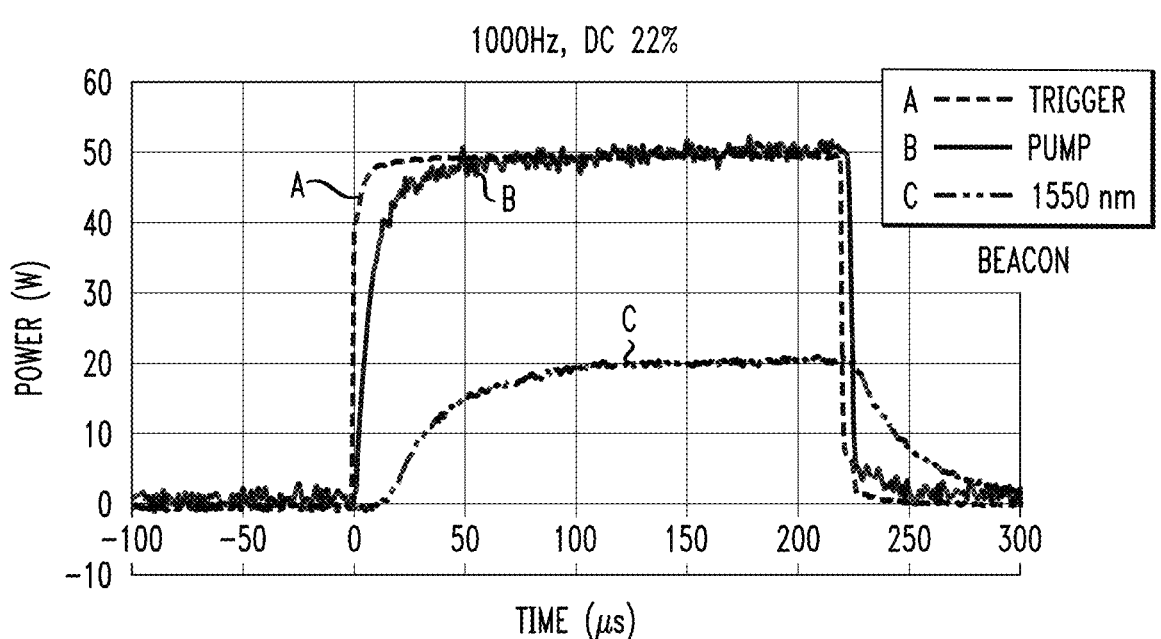
FIG. 11 illustrates the relationship between a trigger pulse, pump pulse and beacon output pulse under yet another set of operating conditions (here, a repetition rate of 1 kHz and a duty cycle of 22%)

FIG. 11 illustrates the relationship between a trigger pulse (curve A), pump pulse $P_2$ (curve B), and beacon output pulse $B_P$ (curve C) under a different set of operating conditions when compared to the data shown in FIG. 10. In this case, the pump pulse repetition frequency (PRF) was increased to 1 kHz (as compared to the 300 Hz rate for the arrangement of FIG. 10) and the duty cycle was increased to 22% (compared to 13% of FIG. 12). It is to be noted that the rise and fall times of beacon source output pulses $B_P$ are mostly independent of repetition rate and duty cycle (comparing curve C of FIG. 10 to curve C of FIG. 11).

Figure 12:
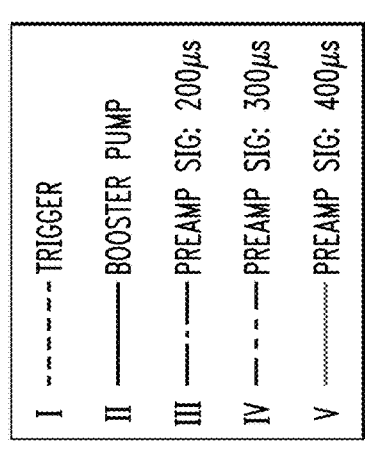
FIG. 12 illustrates data associated with using pulsed pumps in both the preamplifier stage and booster stage of the inventive pulsed beacon source, illustrating the difference in performance as controlled by modifying the timing between the two pulsed pumps.

Displayed in FIG. 12 is data for an inventive pulsed beacon source using pulsed pumps in both the preamplifier stage and the power booster stage (i.e., such as pulsed beacon source 10 of FIG. 1). The illustrated data is associated with controlling the timing delay between triggering booster stage pump pulse $P_2$ and preamplifier stage pump pulse $P_1$. Curve I shows the electronic trigger for the booster stage pump source 26 and curve II is the booster stage pump output $P_2$. Curves III, IV, and V illustrate the amplified, pulsed output $S_P$ from preamplifier stage 14, under three different timing delays between $P_1$ and $P_2$. In these cases, preamplifier pump source 18 is triggered first (generating the $P_1$ pulse train) with the trigger for booster pump source 26 following after a defined delay. In this examples shown in FIG. 12, the repetition rate was 300 Hz and the booster pump duty cycle was 13%. The adjustable timing delays between preamplifier stage 14 and booster stage 16 were 200 µsec (curve III), 300 µsec (curve IV), and 400 µsec (curve IV). It is to be understood that the timing between preamplifier and booster pump pulses may be adjusted as necessary to meet the goals of a given application; for example, to yield high power, flat 1550 nm output pulses without risking damage to the seed laser source itself.

It will be recognized by those skilled in the art that various modifications may be made to the illustrated and other embodiments of the invention as described above, without departing from the broad inventive step thereof. It will be understood therefore that the invention is not limited to the particular embodiments or arrangements disclosed, but is rather intended to cover any changes, adaptations or modifications that are within the scope and spirit of the principles of the invention as defined by the claims appended hereto.

What is claimed is:

1. An optical beacon source comprising
   a continuous-wave (CW) seed laser source for providing a continuous optical signal;
   an optical fiber-based preamplifier including a first section of rare-earth doped gain fiber, the optical fiber preamplifier receiving as separate inputs the continuous optical signal provided by the seed laser source and a first pump beam, the pump beam operating at a wavelength suitable for amplifying the continuous optical signal and forming an amplified optical signal at the output of the preamplifier; and
   an optical fiber-based power booster amplifier including a second section of rare-earth doped gain fiber, the power booster amplifier receiving as separate inputs the amplified optical signal output from the optical fiber-based preamplifier and a second pump beam operating at the wavelength suitable for further amplifying the amplified optical signal to create a beacon output signal, wherein at least one of the first and second pump beams comprises a pulsed pump beam such that the output from the optical fiber-based power booster amplifier comprises a pulsed, quasi-CW, beacon optical signal.

2. The optical beacon source as defined in claim 1 wherein one or more of a pulse width, a duty cycle, and a pulse repetition frequency of the at least one pulsed pump beam are configured to maximize a peak output power of the pulsed, quasi-CW, beacon optical signal.

3. The optical beacon source as defined in claim 1 wherein one or more of a pulse width, a duty cycle, and a pulse repetition frequency of the at least one pulsed pump beam are configured to maximize an extinction ratio of the pulsed, quasi-CW, beacon optical signal.

4. The optical beacon source as defined in claim 1 wherein the optical fiber-based preamplifier is responsive to a CW pump beam and the optical fiber-based power booster amplifier is responsive to a pulsed pump beam.

5. The optical beacon source as defined in claim 1 wherein the optical fiber-based preamplifier is responsive to a pulsed pump beam, generating a pulsed, amplified signal at the output thereof.

6. The optical beacon source as defined in claim 5 wherein the optical beacon source further comprises a pulse shaping element disposed at the input to the power booster amplifier, the pulse shaping element configured to reshape the generated pulsed, amplified signal in a manner to at least minimize gain peaking in the power booster amplifier, providing as an output a quasi-CW beacon optical signal.

7. The optical beacon source as defined in claim 6 wherein the pulse shaping element is configured to re-shape the generated pulsed, amplified signal to exhibit a leading-edge ramp to compensate for gain peaking in the power booster amplifier, providing as an output a quasi-CW beacon optical signal.

8. The optical beacon source as defined in claim 6 wherein the pulse shaping element is further configured to control the pulse width of the generated pulsed, amplified signal.

9. The optical beacon source as defined in claim 8 wherein the pulse shaping element is configured to reduce the pulse width of the generated pulsed, amplified signal in a manner that provides for increased pulse repetition rate and duty cycle in the pulsed, quasi-CW beacon output signal.

10. The optical beacon source as defined in claim 8 wherein the pulse shaping element is configured to reduce the pulse width of the generated signal to a defined pulse width $\tau_{sig}$ and the power booster pump beam comprises a pulsed pump beam exhibiting a pulse width $\tau_{pump}$, where $\tau_{pump}$ is greater than $\tau_{sig}$, thereby increasing a peak power in the pulsed beacon optical signal created as an output.

11. The optical beacon source as defined in claim 6 wherein the pulse shaping element comprises an acousto-optic modulator.

12. The optical beacon source as defined in claim 1 wherein the optical fiber-based preamplifier is responsive to a first pulsed pump beam and the optical fiber-based power booster amplifier is responsive to a second pulsed pump beam.

13. The optical beacon source as defined in claim 12, further comprising
   an external triggering arrangement for controlling the timing of the first pulsed pump beam and the second pulsed pump beam.

14. The optical beacon source as defined in claim 13 wherein the external triggering arrangement is configured such that the second pulsed pump beam lags the first pulsed pump beam.

15. The optical beacon source as defined in claim 1, further comprising
   an optical signal modulator responsive to the continuous optical signal from the seed laser source for modulating the continuous output to form a signal pulse train input for the optical fiber-based preamplifier.

16. The optical beacon source as defined in claim 15 wherein the signal pulse train exhibits a pulse width $\tau_{sig}$ and the preamplifier pump beam comprises a pulsed pump beam exhibiting a pulse width $\tau_{pump}$, where $\tau_{pump}$ is greater than $\tau_{sig}$.

17. The optical beacon source as defined in claim 15 wherein the optical signal modulator is disposed along a signal path between the output of the CW seed laser source and the input to the preamplifier.

18. The optical beacon source as defined in claim 15 wherein the optical signal modulator comprises a direct modulator coupled to the CW seed laser source for providing pulsed operation of the CW seed laser source.

19. The optical beacon source as defined in claim 1 wherein at least one of the first and second pump beams is provided by a co-propagating pump source.

20. The optical beacon source as defined in claim 1 wherein at least one of the first and second pump beams is provided by a counter-propagating pump source.

\* \* \* \* \*